United States Patent
Peterson et al.

(12)

(10) Patent No.: US 6,453,927 B1
(45) Date of Patent: Sep. 24, 2002

(54) METHOD AND APPARATUS FOR PRECISELY DISPENSING LIQUIDS

(75) Inventors: Jason W. Peterson, Erie, PA (US); F. John Mara, Ripley, NY (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 09/858,734

(22) Filed: May 16, 2001

(Under 37 CFR 1.47)

(51) Int. Cl.[7] .............................................. G05D 11/13
(52) U.S. Cl. .................. 137/3; 137/93; 137/565.33; 417/211.5; 417/287; 417/474; 417/5
(58) Field of Search .......................... 417/5, 211.5, 287, 417/474; 137/565.33, 3, 93

(56) References Cited

U.S. PATENT DOCUMENTS

| | | | |
|---|---|---|---|
| 3,198,121 A | * | 8/1965 | Schaub |
| 3,684,408 A | | 8/1972 | Maclin |
| 3,994,687 A | | 11/1976 | Engelbrecht |
| 4,252,447 A | | 2/1981 | Borodin |
| 4,259,038 A | * | 3/1981 | Jorgensen et al. ............. 417/5 |
| 4,513,796 A | * | 4/1985 | Miller et al. |
| 4,735,227 A | * | 4/1988 | Royse et al. ................... 137/92 |
| 4,845,965 A | | 7/1989 | Copeland et al. |
| 4,964,185 A | | 10/1990 | Lehn |
| 4,981,024 A | | 1/1991 | Beldham |
| 5,014,211 A | | 5/1991 | Turner et al. |
| 5,390,385 A | | 2/1995 | Beldham |
| 5,597,094 A | | 1/1997 | Vilbert |

FOREIGN PATENT DOCUMENTS

GB           696673           9/1953

OTHER PUBLICATIONS

Watson Marlow Data Sheet Jul. 16, 1997, 8 pages, Wilmington, MA, USA.

* cited by examiner

Primary Examiner—Stephen M. Hepperle
(74) Attorney, Agent, or Firm—Pitts & Brittian, P.C.

(57) ABSTRACT

A method and apparatus are provided for continuously dispensing precise quantities of a liquid from a dispenser holding tank into a receiving tank. A first elastic tube permits fluid flow between the holding tank and the receiving tank and a first peristaltic pump controls the flow rate of liquid through the first elastic tube. A second elastic tube permits fluid flow between the holding tank and the receiving tank and a second peristaltic pump controls the flow rate of liquid through the second elastic tube. The flow rates through the first and second elastic tubes are independently controlled. The flow rate through the first elastic tube is maintained generally constant and at a substantially greater rate than the flow rate of the second elastic tube. The flow rate in the second elastic tube is varied to maintain a desired total flow rate into the receiving tank.

7 Claims, 1 Drawing Sheet

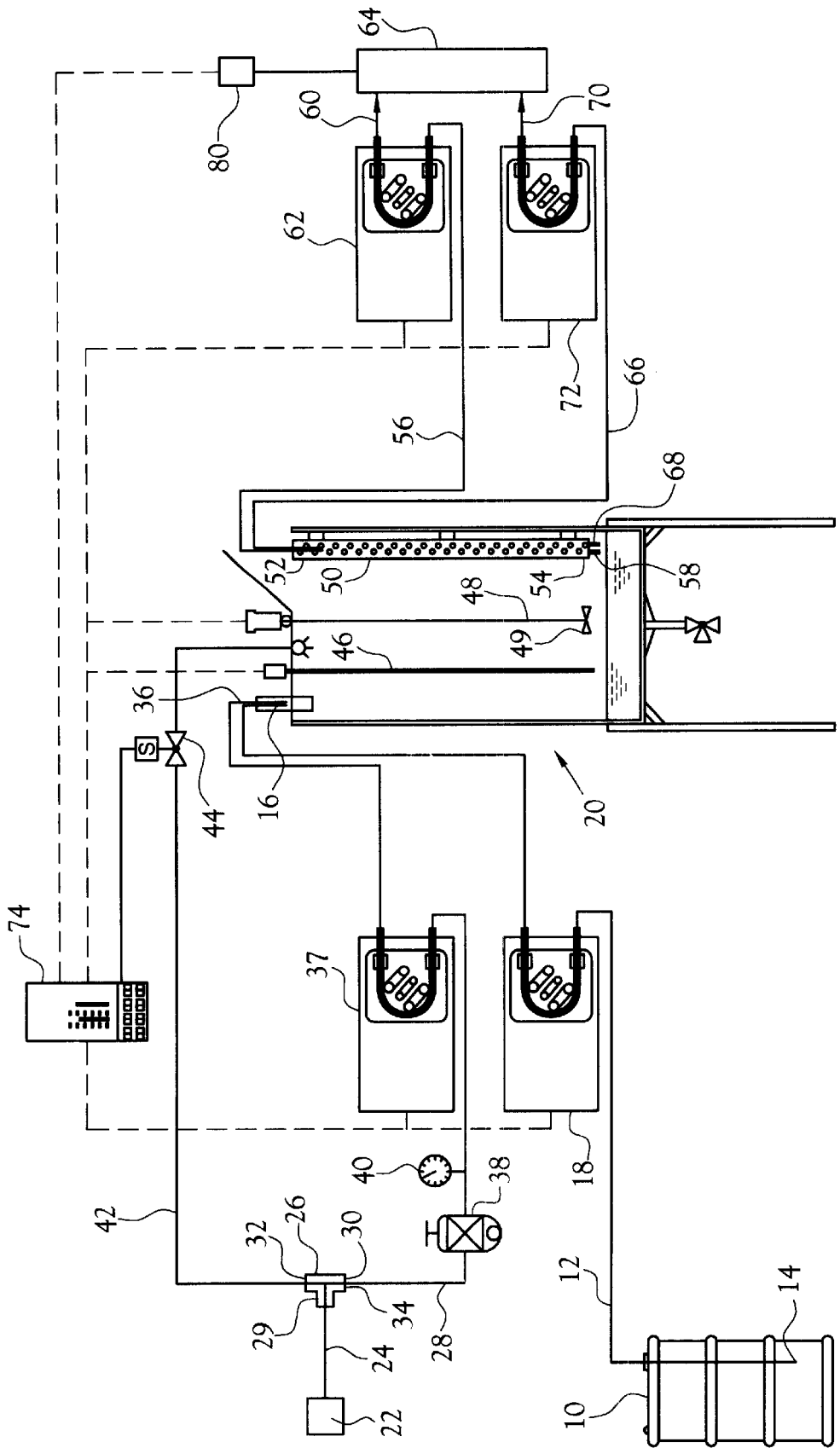

METHOD AND APPARATUS FOR PRECISELY DISPENSING LIQUIDS

TECHNICAL FIELD

The present invention relates generally to a method and apparatus for continuously dispensing precise amounts of a liquid and more particularly to a method and apparatus for maintaining precise concentrations of a dye within a liquid solution or paper slurry.

BACKGROUND ART

It is recognized in the paper industry that it is extremely important to maintain a very constant color intensity within a paper run. There are two primary issues involved in maintaining constant color intensity: (1) diluting a concentrated dye to a production concentration and (2) mixing appropriate amounts of the production concentration to the slurry to maintain a constant color intensity in the final product. Over the years it was the practice in paper mills to prepare large batches of diluted dye for each production run. Each batch was held in one or more large tanks, which were then used to supply dye during the course of the paper production run. It is readily apparent that this batch system was expensive to construct and maintain and that it led to much waste of diluted dye because an excessive amount of diluted dye had to be prepared to ensure the supply would not run out before the run was completed. Excess diluted dye could only be disposed rather than saved for another production run. Also, the holding tanks and related plumbing required regular cleaning between batches, generating substantial costs in both materials and personnel. Furthermore, either several sets of tanks had to be maintained in order to change colors during a run or a succeeding color had to wait until the tanks and plumbing were cleaned and a new batch of dye was prepared. In any event, the entire batch system was quite cumbersome and costly to operate.

Various types of pumps have been used to supply dye solutions from storage tanks to slurry tanks in paper mills. Precision ground gear pumps and plunger pumps have been used with some success, but they suffer from several inadequacies. In particular, because the dye comes into direct contact with the interior surfaces of the pumps, substantial cleaning of the pump is required when a color is changed. Also, the gear type pumps lose precision over time because the dyes aggressively attack the pump materials and the plunger type pumps suffer from check valve failures (which prevent dye delivery). It has been found that peristaltic pumps overcome many of these problems. In particular, a peristaltic pump urges liquid through an elastic tube by sequentially pinching the tube between a rotating roller and a fixed surface. There is no direct contact between the dye solution and the pump mechanism and therefore there is no need to clean the pump mechanism when a dye is changed. The elastic tubes are either stored for re-use with a similar dye or discarded because of their relatively modest cost. Also, because the dye solution does not contact the pump mechanism, it cannot attack the pump materials and thereby affect the effective volume of the dye solution being delivered.

Although the peristaltic pumps have proven beneficial, a single peristaltic pump is most precise in its operation when it is sized for the desired volume of dye being dispensed. That is to say, a small peristaltic pump obviously cannot handle large volumes well nor can a large peristaltic pump make precise adjustments in flow at low flow rates. Therefore it has still been necessary to replace pumping equipment when substantially different volumes of dye are being added to a slurry.

Accordingly, it is an object of the present invention to provide a method and apparatus for preparing a diluted solution on a continuous basis while minimizing the possibility of running out of solution while a concentrate supply tank is replaced, for example.

It is also an object of the present invention to provide a method and apparatus for dispensing precise amounts of a liquid over a wide variety of flow rates using a single set of peristaltic pumps.

These and other objects of the present invention will become apparent upon consideration of the drawing referred to hereinafter and a complete description thereof.

DISCLOSURE OF THE INVENTION

In accordance with the present invention, a method and apparatus is provided for continuously dispensing a precisely controlled amount of liquid from a holding tank into a receiving tank. An elastic coarse tube and an elastic fine tube each permit flow of fluid between the holding tank and the receiving tank. The coarse tube is sized to allow a substantially greater flow rate of the liquid than the fine tube is sized to allow. The flow rates of liquid through the coarse tube and the fine tube are independently controlled by a coarse peristaltic pump and a fine peristaltic pump, respectively. The flow rate of liquid through the coarse tube is set at a level less than the desired total flow rate of liquid into the receiving tank and maintained at a generally constant level. The flow rate of liquid through the fine tube is regularly adjusted to precisely maintain the desired total flow rate of liquid into the receiving tank. In the event that the desired total flow rate of liquid into the receiving tank cannot be achieved through adjustment of the flow rate through the fine tube, the flow rate through the coarse tube is incrementally reset and again maintained at a generally constant level while the flow rate through the fine tube is again regularly adjusted to maintain precise control of the total flow rate. (The pumps are reranged for control.)

The holding tank may be continuously supplied with liquid through an elastic diluent (e.g. water) tube from a diluent source and an elastic concentrate tube allowing fluid flow from a concentrate source. The flow rate of diluent through the diluent tube is controlled by a diluent peristaltic pump. The flow rate of concentrate through the concentrate tube is independently controlled by a concentrate peristaltic pump.

An electronic controller may be used to constantly monitor the total flow rate into the receiving tank, constantly monitor the volume of the liquid in the holding tank and independently adjust the speeds of the peristaltic pumps and hence the total throughput.

BRIEF DESCRIPTION OF THE DRAWING

The above mentioned features of the invention will become more clearly understood from the following detailed description of the invention read together with the claims and drawing in which: The FIGURE is a schematic view of a system for practicing the method of the present invention.

BEST MODE FOR CARRYING OUT THE INVENTION

A schematic drawing of a system for continuously preparing a diluted dye solution and dispensing the prepared dye solution into a slurry tank in a paper mill is depicted in the Figure. In the depicted system, concentrated raw dye is stored in a drum 10. An elastic concentrate tube 12 having an entry end 14 and an exit end 16 extends downwardly into the drum 10, through the dye contained therein. The entry end 14 is located at a level adjacent to the bottom of the drum 10 in order to withdraw by suction the maximum amount of dye. The concentrate tube 12 passes through and is operatively engaged by a concentrate peristaltic pump 18 and the exit end of the tube 12 is attached within the upper portion of a 30 gallon, for example, dilution tank 20. Water, a diluent for the concentrated dye, is supplied from a water source 22 through a conduit 24 to an inlet tee 26 having an inlet 29 and two outlets 30 and 32. An elastic diluent tube 28 having an entry end 34 and an exit end 36 is attached at its entry end to the outlet 30. The elastic tube 28 passes through and is operatively engaged by a diluent peristaltic pump 37 and the exit end 36 is attached within the upper portion of the dilution tank 20. A pressure regulator 38 is located within the tube 28 to reduce the water pressure to a constant 10 p.s.i., for example. A pressure gauge 40 is also located in the tube 28 to allow monitoring of the water pressure. A conduit 42 extends from the outlet 32 of the tee 26 to a location inside the tank 20 where it can supply water for rinsing and cleaning the tank 20. A valve 44 is located within the conduit 42 for selective control of water flow through the conduit 42."

A microwave sensor 46 for sensing the top surface of liquid within the tank 20 (and thereby determining the volume of liquid in the tank 20) extends from the top of the tank 20 downwardly within the tank to a location adjacent to the bottom of the tank 20. A rotatable stirrer 48 extends from the top of the tank 20 to a location adjacent to and spaced from the bottom of the tank 20 where it includes a stirrer blade 49. A vertical, perforated cylinder 50, having a top end 52 and a bottom end 54 is attached to the inside wall of the tank 20 and extends from the top of the tank 20 to a location adjacent to the bottom of the tank 20.

An elastic coarse tube 56, having an entry end 58 and an exit end 60, extends from its entry end 58, located within the perforated cylinder 50 adjacent to the bottom 54, through and in operative engagement with a coarse peristaltic pump 62. The exit end 60 extends into a slurry tank 64 to discharge solution drawn by suction from the tank 20. An elastic fine tube 66, having an entry end 68 and an exit end 70, extends from its entry end located within the cylinder 50 adjacent to the bottom end 54 through and in operative engagement with a fine peristaltic pump 72. The exit end 70 extends into the slurry tank 64 to discharge solution drawn by suction from the tank 20. The coarse tube 56 is sized in order to accommodate the broadest range of volumes of dye solution provided to the tank 64. For example, in a paper mill a coarse elastic tube of a size allowing 2200 cc/min may be appropriate. The coarse tube 56 has a substantially greater maximum flow rate than the fine tube, for example a ratio of about 5 to 1. In any event, the maximum flow rate through the fine tube 66 is not less than the minimum flow rate of the coarse elastic tube 56.

The elastic tubes 12, 28, 56 and 66 preferably comprise an elastic material such as MARPRENE®) having a 2.4 mm wall thickness for extended life. However, any solution to be dispensed must be tested with the elastic material to ensure that it will not be destructive to the tubing.

A controller 74 is electrically connected to each of the peristaltic pumps 18, 37, 62 and 72. The controller 74 is also electrically connected to the valve 44, the sensor 46, and the stirrer 48.

In operation, the controller 74 simultaneously activates the diluent pump 37 and the concentrate pump 18 to draw by suction concentrated dye from the drum 10 and water from the source 22, respectively. The drawn water and dye are pumped through the elastic tubes 28 and 12, respectively, for discharge into the holding tank 20. The relative volumes of water and dye are based upon the concentration of the dye and the desired concentration of diluted solution to be delivered to the tank 64. The sizes of the elastic tubes 12 and 28 are selected based upon the volume of dye and water which will be needed in order to satisfy the requirements of the mill. For example, if a mill requires 1,000 cc/min of a 10% dye solution, then a flow rate of 100 cc/min of dye is required and a flow rate of 900 cc/min of water is required. In this situation, a dye tube 12 having a maximum flow rate of 410 cc/min and a minimum flow rate of 3.7 cc/min could be paired with a water tube 28 having a maximum flow rate of 2,200 cc/min and a minimum flow rate of 20 cc/min.

When the top surface of diluted solution in the tank 20 reaches a level above the stirrer blade 49, as sensed by the sensor 46 and communicated to the controller 74, the controller 74 activates the stirrer 48 to rotate and thus blend the water and dye to a homogeneous solution. Water and dye continue to be added to the tank 20 until a predetermined fill level, such as 50%, is reached as sensed by the sensor 46 and communicated to the controller 74, at which time the controller 74 stops the pumps 18 and 37. At this point the diluted solution in the tank 20 may be drawn down to a predetermined minimum level, such as 30%, at which time the pumps 18 and 37 are restarted to supply fresh dye and water, respectively, at pre-set flow rates to replenish the dye solution until the maximum level is achieved again. The minimum level in the tank 20 should be set to accommodate the time during which the pumps 18 and 37 may be inoperable because the raw dye drum 14 requires replacement or a pump requires replacement, for example.

When the diluted solution in the tank 20 reaches a predetermined start level, as sensed by the sensor 46 and communicated to the controller 72, the controller 72 simultaneously activates the coarse peristaltic pump 62 and the fine peristaltic pump 72 to dispense dye solution into the tank 64. Initially, the coarse peristaltic pump 62 is set to produce a generally constant flow rate that, when added to 50% of the maximum flow rate produced by the fine peristaltic pump 72, results in the total desired flow rate into the tank 64. For example, if the total desired flow rate into the tank 64 is 1000 cc/min and the maximum flow rate through the fine tube 66 with the fine peristaltic pump is 220 cc/min, then the coarse peristaltic pump should be set to provide solution at an initial flow rate of 890 cc/min. The initial flow rate through the fine tube would be 110 cc/min, i.e. 50% of the maximum flow rate for the fine tube.

If an operator determines, either through visual analysis or spectrographic analysis by the spectrometer 80, that the amount of dye solution being dispensed is too low, then the controller 74 increases rotational speed of the fine peristaltic pump 72 to produce a greater total flow rate into the tank 64. Conversely, if it is determined that the amount of dye solution exceeds desired levels, then the controller reduces the rotational speed of the fine peristaltic pump 72 to reduce the total flow rate into the tank 64.

If the fine peristaltic pump 72 reaches a predetermined maximum flow rate or minimum flow rate, then the controller 74 resets the rotational speed of the coarse peristaltic pump 62 to compensate for the difference between the predetermined minimum or maximum flow rate that was reached and the flow rate that is 50% of the maximum flow rate. At this time the fine peristaltic pump 72 is reset by the controller 74 to the rotational speed that achieves a flow rate through the fine tube 66 that is 50% of maximum flow rate and the cycle begins anew.

In accordance with the present invention, a minimal amount of diluted dye solution is constantly available to be dispensed from a dilution or holding tank without requiring a large tank and pumping system. There is no possibility of generating large volumes of wasted dye solution. In addition, very precise adjustments can be made in the amount of solution being dispensed.

While a preferred embodiment has been shown and described herein, it will be understood that it is not intended to limit the disclosure, but rather is intended to cover all modifications and alternate methods and apparatus within the spirit and scope of the invention as defined in the appended claims.

We claim:

1. A method of continuously dispensing precise quantities of a liquid from a dispenser comprising a holding tank containing said liquid, a first elastic tube permitting fluid flow from a holding tank to a receiving tank, a second elastic tube permitting fluid flow between said holding tank and said receiving tank, a first peristaltic pump controlling the flow rate of said liquid through said first elastic tube, and a second peristaltic pump controlling the flow rate of said liquid through said second elastic tube, said method comprising the steps of independently controlling the flow rates of said liquid through said first elastic tube and said second elastic tube, maintaining a generally constant flow rate of liquid through said first elastic tube at a substantially greater rate than the flow rate of liquid through said second elastic tube, and varying the flow rate through said second elastic tube to maintain a desired total flow rate.

2. A method in accordance with claim 1 and including the steps of establishing a maximum flow rate of liquid through said second elastic tube, establishing a minimum flow rate of liquid through said second elastic tube and re-setting the flow rate of liquid through said first elastic tube and said second elastic tube when said flow rate through said second elastic tube equals either said minimum flow rate or said maximum flow rate.

3. A method in accordance with claim 1 and including the steps of continuously monitoring the concentration of liquid dispensed into said receiving tank and independently controlling the flow rates induced by said first peristaltic pump and said second peristaltic pump to maintain a constant concentration of liquid in said receiving tank.

4. A method in accordance with claim 1 and including the step of controlling the flow rate of a diluent from a diluent source through an elastic diluent tube to said holding tank with a diluent peristaltic pump and controlling the flow rate of a concentrate from a concentrate source through an elastic concentrate tube to said holding tank with a concentrate peristaltic pump.

5. A method in accordance with claim 4 and further including the steps of continuously monitoring the volume of solution in said dilution tank, activating said diluent peristaltic pump and said concentrate peristaltic pump when said volume of solution falls below a predetermined minimum volume and de-activating said diluent peristaltic pump and said concentrate peristaltic pump when said volume of solution exceeds a predetermined maximum volume.

6. A system for continuously dispensing precise quantities of a liquid into a receiving tank comprising a holding tank containing said liquid, a first elastic tube providing flow communication between said holding tank and said receiving tank, a second elastic tube providing flow communication between said holding tank and said receiving tank, a first peristaltic pump operatively engaged with said first elastic tube to control the flow rate of said liquid through said first elastic tube, a second peristaltic pump operatively engaged with said second elastic tube to control the flow rate of said liquid through said second elastic tube, and a controller connected to said first peristaltic pump and said second peristaltic pump, said controller maintaining a generally constant flow rate of liquid through said first elastic tube at a substantially greater rate than the flow rate of liquid through said second elastic tube and varying the flow rate through said second elastic tube to maintain a desired total flow rate.

7. A system in accordance with claim 6 and further comprising a concentrate source, a diluent source, an elastic concentrate tube providing flow communication between said concentrate source and said holding tank, an elastic diluent tube providing flow communication between said diluent source and said holding tank, a concentrate peristaltic pump operatively engaged with said concentrate tube, a diluent peristaltic pump operatively engaged with said diluent tube, and a sensor monitoring the volume of liquid within said holding tank said controller being connected to said sensor, said concentrate peristaltic pump and said diluent peristaltic pump.

* * * * *